(12) United States Patent
Folkmar

(10) Patent No.: US 6,971,611 B2
(45) Date of Patent: Dec. 6, 2005

(54) STAND FOR PASTRY BAG

(76) Inventor: Jan Folkmar, Gotthardstasse 43 P.O. Box 263, Weggis (CH) CH6353

( * ) Notice: Subject to any disclaimer, the term of this patent is extended or adjusted under 35 U.S.C. 154(b) by 0 days.

(21) Appl. No.: 10/754,528

(22) Filed: Jan. 12, 2004

(65) Prior Publication Data

US 2005/0151033 A1    Jul. 14, 2005

(51) Int. Cl.$^7$ ............................................. B65B 67/12
(52) U.S. Cl. ....................................................... 248/95
(58) Field of Search ............................ 248/95, 97, 99, 248/100, 101, 907; 141/10

(56) References Cited

U.S. PATENT DOCUMENTS

| | | | | |
|---|---|---|---|---|
| 4,157,801 A | * | 6/1979 | Elmer | 248/97 |
| 4,901,959 A | * | 2/1990 | Stage | 248/97 |
| 5,564,660 A | * | 10/1996 | Gyor | 248/97 |
| 5,857,722 A | * | 1/1999 | Ayotte | 294/1.1 |

* cited by examiner

Primary Examiner—Ramon O. Ramirez

(57) ABSTRACT

A stand for supporting an open-ended conical plastic bag, has an upper rim portion, over which a portion of the bag open end may be folded, in securing relation; a like lower rim portion supports the stand in stable, self-supporting relation. The stand consists of two identical segment portions, which clip together. Each segment has first and second longitudinal ribs joining the opposed rim portions. Almost half the length of each first rib is arcuately recessed to secure a corresponding length of the other first rib, when reversed, in entered relation within the recess. The arcuate recess has protruding ear portions which serve as clips for securing the entered other first rib, which ear portions also engage the sides of protrusions of the other first rib to stabilize it in the recess. Other local first rib protrusions enter into corresponding recesses located in the bottom of the opposed first rib arcuate recess.

10 Claims, 3 Drawing Sheets

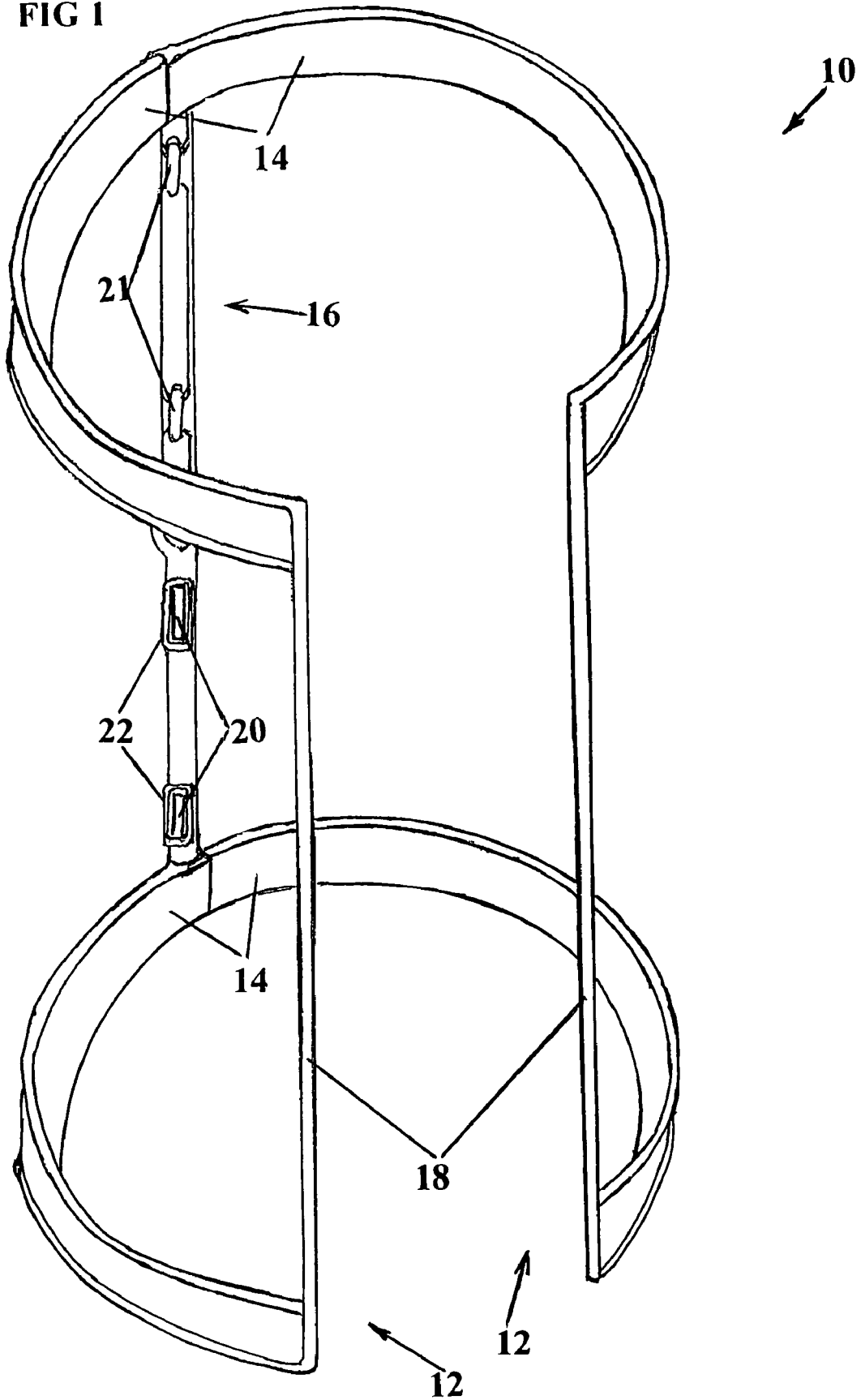

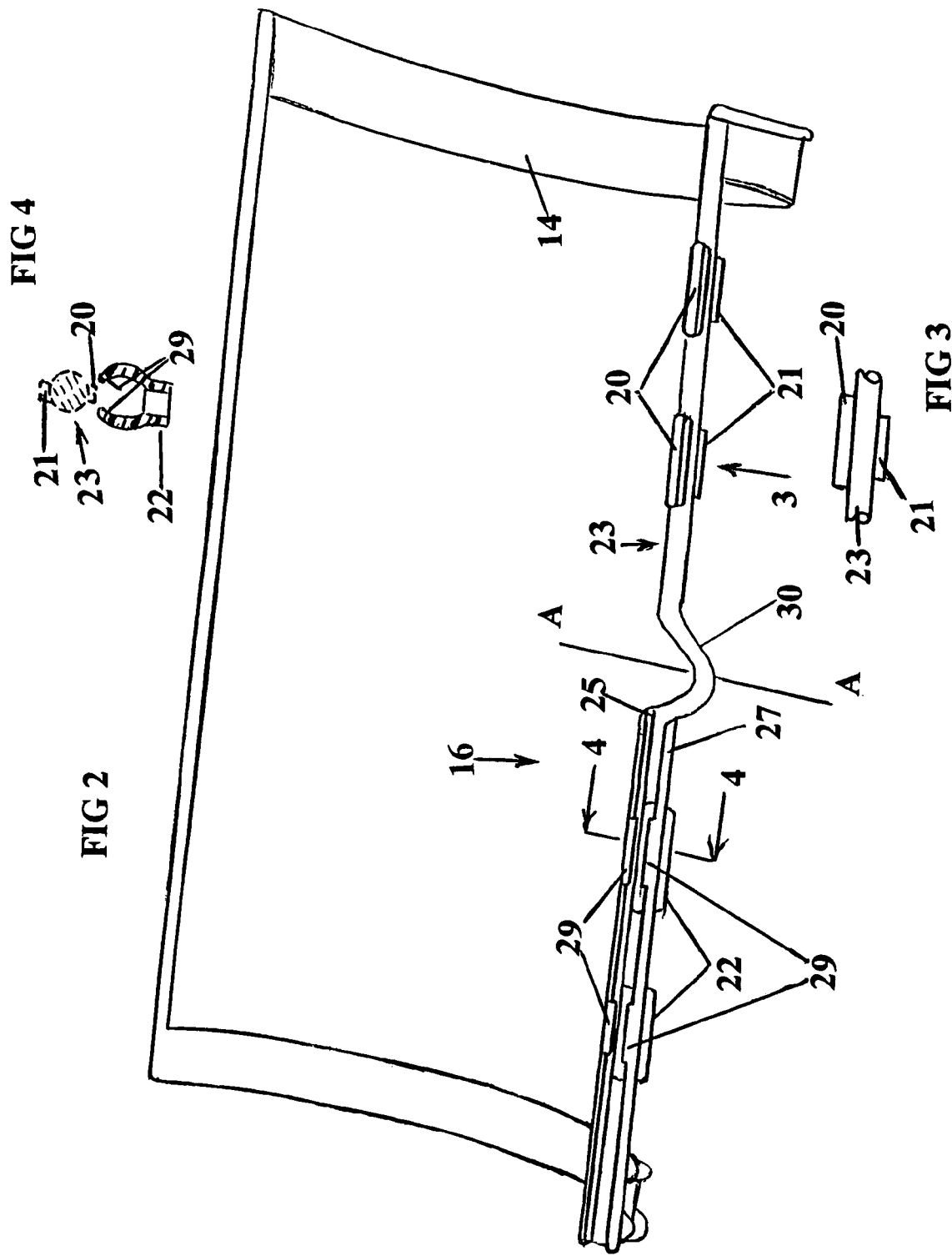

STAND FOR PASTRY BAG

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

This invention is directed to a stand for holding a flexible bag; it is particularly described in relation to bags used in the culinary arts, commonly referred to as pastry bags or icing bags, although they may also find use with other materials having a similar consistency and in other arts, and in particular, to a portable stand for use with such bags. In the application of sugar-based icing to pastries and the like, widespread use is made of icing bags. A typical icing bag may have a conical form, and may be made from fabric, or increasingly, from plastic film so as to be disposable. Its size may vary considerably, and typically it may have a length of about thirty-five cm (fourteen inches), and a major diameter, at its mouth, of about fifteen cm (six inches). In using a disposable bag, the end tip of the bag is cut off and a profiled nozzle inserted in close fitting relation within the bag cut end, having the nozzle outlet projecting outwardly from the bag. On partially filling the bag with icing, for application upon an object such as a cake, by wrapping the mouth of the bag so as to seat it, the bag can then be compressed, and some of the icing contents thereof expressed through the profiled nozzle outlet, onto the surface being decorated.

The problem of bag handling arises a number of times during the use of an icing bag. When single-handedly loading the bag with icing, difficulty may be experienced in holding the bag open and simultaneously pouring or scooping the icing into the bag. Then, on completing a phase of the application of the icing, there arises the need to temporarily store the partially filled bag in a safe, non-spill mode. Laying the bag on its side on a counter-top can readily lead to the contents exuding through the mouth of the bag onto the counter and an undesirable stickiness on the outer surface of the bag.

BRIEF SUMMARY OF THE INVENTION

The present invention provides a stand for use in supporting an open-ended bag having a generally predetermined range of sizes, wherein the stand has an upper rim portion, over which a portion of the bag open end may be folded, in relation to hold the bag open for filling. The subject stand has a lower rim portion, on which the stand may be stood in stable, self-supporting relation.

The stand consists of two segment portions, which are suitably identical, and which may be assembled together without the use of tools or ancillary parts in a stable, unified relationship, and which may be readily disassembled for storage purposes.

In accordance with the invention, each segment has opposed rim portions and first and second longitudinal ribs joining the rim portions. Almost half the length of each first rib is arcuately recessed to receive a corresponding length of the other first rib, when reversed, in entered relation within the recess. The arcuate recess has protruding ear portions which subtend an arc of more than 180 degrees, to serve as clips for securing the entered other first rib, which ear portions also engage the sides of local protrusions of the other first rib, to prevent it from twisting within the recess, while also limiting the force required to disengage the two ribs when it is desired to disassemble the stand. Other local, somewhat larger first rib protrusions enter into corresponding recesses located in the bottom of the opposed arcuate recesses. The protrusions collectively serve to position the respective rim portions of the stand in mutually aligned relation.

In accordance with the preferred embodiment, the stand consists of two identical segment portions, each portion having a first, longitudinal rib extending between the upper and the lower rim, with at least one first protrusion projecting from the rib at a predetermined distance on one side of a reference datum, and a correspondingly shaped recess, sized to receive and hold the protrusion, and located the same, predetermined distance on the other side of the reference datum. Consequently, taking the second stand portion, and reversing it longitudinally, brings the first protrusion of the second portion into aligned relation with the recess of the first portion, and vice versa, for entry and retention therein, so that the first ribs of the two portions can be readily joined securely together under digital pressure, having their respective rim portions in mutually aligned relation, to form the subject stand.

By providing the first ribs with pairs of the first protrusions and matching first recesses, an aligned and more stable joint is provided. Also, each segment portion has a second, plain rib at its end opposite from the first rib, and joining the upper and lower rims. The segments, when arcuate, may circumscribe a portion of a circle of some 320 degrees, thus defining a stand having a nominal rim diameter and an axial gap. The arrangement facilitates the use of the stand, both in securing an empty icing bag in place upon the stand, and in retrieving a filled bag from the stand by passage.

On assembly, the first rib portions of the mutually reversed segments are simply brought into mutual registry and clipped together, so that the protrusions of one segment are inserted into the opposed recesses of the other segment. The first ribs are conveniently and preferably also provided with second, torque protrusions, located for convenience in back-to-back relation with the first protrusions. These second protrusions fit closely between projecting ear portions of the first rib, and serve to prevent relative twisting of the first rib portions when clipped together, thus maintaining the adjoining rim portions in mutually aligned relation.

The ear portions serve as containment clips, to retain the opposed first rib portions in assembled juxtaposed relation, while also limiting the force required to disassemble the stand.

Also suitably and preferably, each of the first ribs may be provided with a deflected portion mid-way along its length, thereby forming an aperture when the stand is assembled, by means of which the stand may be secured to a support surface as a permanent installation, or stored upon a hook for ready removal and use. The deflected mid-portion also imparts greater flexibility to the first ribs, to facilitate assembly and disassembly of the stand. Assembly of the two stand components is a simple, manual procedure of aligning and clipping the two halves together, under reasonable digital compression.

The adoption of a stand composed of two identical portions minimizes production costs and simplifies stockkeeping, while also greatly reducing shipping space requirements and packaging costs, by permitting such handling in a nested condition.

BRIEF DESCRIPTION OF THE DRAWINGS

Certain preferred embodiments of the invention are described by way of illustration, without limitation thereto other than as set forth in the accompanying claims, reference being, made to the accompanying drawings, wherein FIG. 1 is a perspective view of a two-segment stand in accordance with the present invention, in assembled relation;

FIG. 2 is a side-perspective of one segment of the arcuate stand embodiment;

FIG. 3 is a scrap side view from the direction 3 of FIG. 2;

FIG. 4 is a cross section taken at 4—4 of FIG. 2; and,

DETAILED DESCRIPTION OF THE INVENTION

Figure 5:
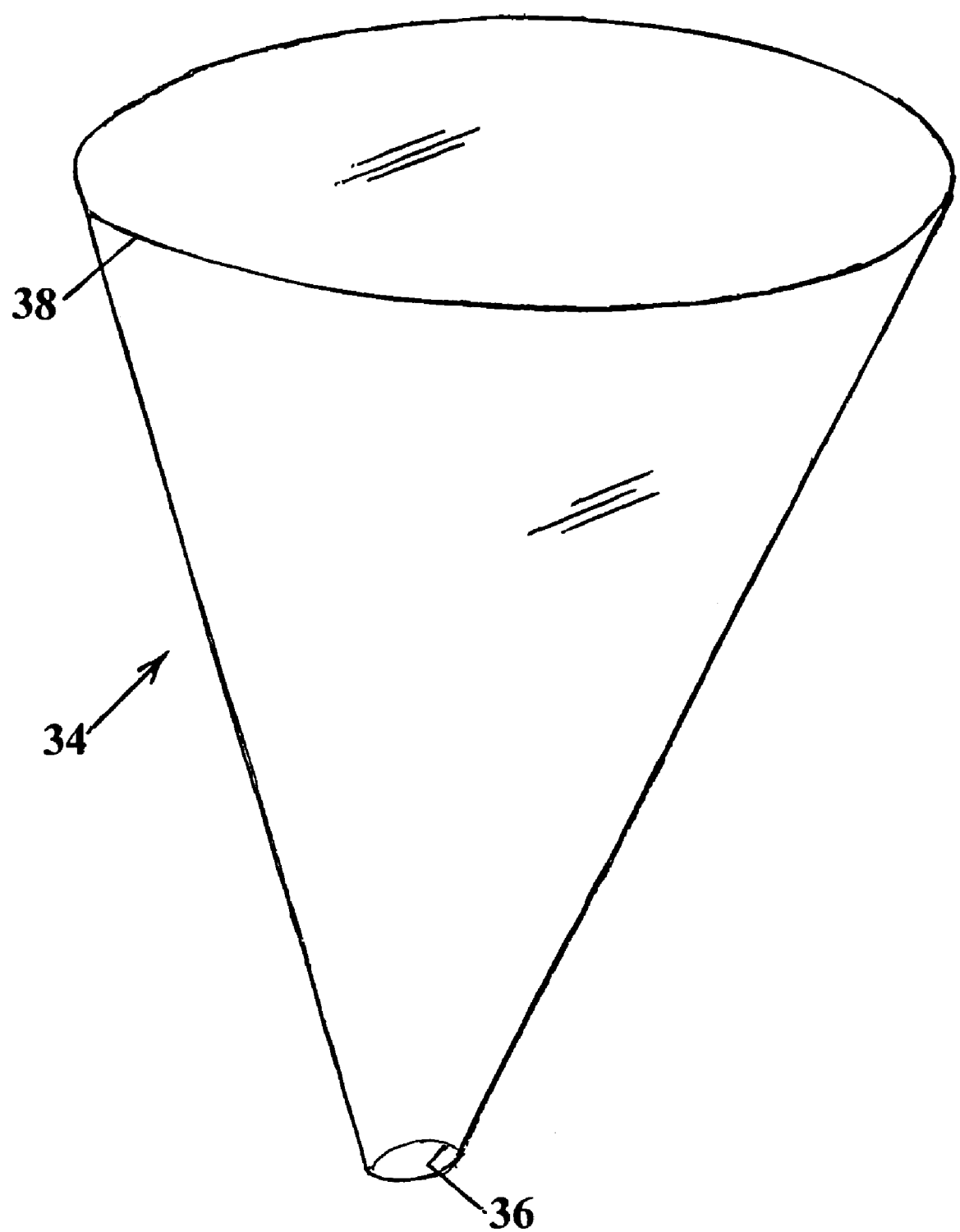
FIG. 5 is a perspective side view of a typical conical icing bag such as may be supported by the stand.

Referring to FIG. 1, the subject stand 10 is illustrated as having two identical segment portions 12, 12. As shown in FIG. 2, each portion 12 has two end rim portions 14, joined by a first rib 16 and a second rib 18. The rim portions 14 are illustrated as being arcuate. The first ribs 16 of FIG. 1 are joined in mutually interlocking relation, which serves to hold the two stand portions 12 in firmly assembled relation. In the illustrated embodiment, the first, longitudinal rib 16 has two major protrusions 20 projecting radially from the outer surface of a portion 23 of rib 16. The protrusions 20 are located predetermined distances on one side of a reference datum A—A, and correspondingly shaped radially disposed recesses 22, sized to receive and hold the protrusions 20, are located the same, predetermined distances on the opposite side of the reference datum A—A. It will be understood that the protrusions 20 of one stand segment 12 are in registry with the recesses 22 of the other stand segment 12, when inverted to enable assembly of the segment portions 12.

The recesses 22 adjoin hollow wall portions 25, 27 which extend for approximately one half the length of the rib 16, being sized diametrically to receive the portion 23 of rib 16 in flush-fitting relation therein (see FIG. 4). Minor protrusions 21 projecting from the inner surface of a rib 16 extend between projecting ear portions 29 of the other rib 16. The inter-engagement of the minor protrusions 21 and the projecting ear portions 29, serves to keep the adjoined rim portions 14 in mutual arcuately aligned relation. The ear portions 29 serve also as clips, to retain the portion 23 of first rib 16 in inserted relation within the hollow wall portions 25, 27 of the other first rib 16. Consequently, by taking the second stand portion 12, and inverting it, brings the protrusion 20 of the second stand portion 12 into aligned registry with the respective recesses 22 of the first portion 12, for entry and retention therein, so that the first ribs 16, 16 of the two portions can be "married" securely together, thus bringing their rim portions 14 into mutually aligned relation, to form the subject stand. By providing the first ribs 16 with pairs of first protrusions and matching recesses, an aligned and stable joint is provided. Also, each segment portion has its second, plain rib 18 at its end opposite from the first rib 16. The segments, when arcuate, may circumscribe a portion of a circle, shown as being some 320 degrees, thus defining an axial gap to facilitate the use of the stand, both in securing an empty icing (or other-use) bag in place upon the stand, and in retrieving a filled bag from the stand. The axial gap also lends flexibility to the stand 10, for use with bags of a range of sizes that may have a diameter at their mouth end that is smaller and/or larger than the nominal rim diameter.

Each of the aforesaid first ribs 16 are shown provided with a V-shaped deflected portion 30 mid-way along its length. When the two ribs 16 are assembled to each other in their mutually reversed relation the portions 30 together form an aperture, by means of which the stand may be secured to a vertical support surface as a permanent installation, or hung from a storage hook for ready removal and use.

Referring to FIG. 5, a plastic icing bag 34 of conical form has a minor aperture 36 where the bag tip has been removed, to permit the projection of a profiled icing nozzle. The upper edge 38 of the bag 34 is folded over the upper edge of the top rim 14 of the stand 10. In one embodiment of the stand 10, the flexibility of the rims 14 permits the fitting of bags having a wide range of mouth sizes, or the rolling down of a wide cuff portion of the bag 34, so as to compress the rim 14 to a smaller effective diameter.

What is claimed is:

1. A portable stand for attachment of a bag in supported relation thereon, said stand having two identical, first and second, half portions assembled together in secured, adjoining relation to form a shaped upper rim and a shaped lower rim, with supporting rib means extending therebetween, said lower rim portion serving to support said stand from a surface in stable, standing relation;

each of said first and second half portions including a first rib forming a part of said rib means; wherein said first rib of said first half portion has at least one protrusion projecting radially from the rib located a predetermined distance from a reference datum, and wherein said first rib of said second half portion has at least one radially disposed recess sized to receive and hold said protrusion located said predetermined distance from said datum, said protrusion when received in said recess serving to maintain said first rib of said first half portion in secured, engaged relation with said first rib of said second half portion to retain said portions in their assembled adjoining relation.

2. The portable stand as set forth in claim 1, wherein said upper and lower rims subtend a partial arc of a circle and are flexible, to enable the size of the arc to be varied.

3. The portable stand as set forth in claim 1, wherein said upper and said lower rims are in adjoining relation at the juncture of said first ribs, and wherein the end of said rims remote from said first ribs are in mutually spaced apart relation.

4. The portable stand as set forth in claim 1, wherein said first rib has a second protrusion and car portions disposed at similar, spaced apart positions on opposed sides of said reference datum, said second protrusion of one said rib serving to engage car portions of another said first rib, in use to maintain said two first ribs in mutually secured, non-twisting relation.

5. The portable stand as set forth in claim 1, wherein said upper and lower rims are of substantially arcuate form subtending less than 180 degrees.

6. The portable stand as set forth in claim 1, wherein said first ribs each have a centrally located portion offset in underlying relation below a said rim, said offset portions combining upon assembly to form an aperture.

7. The portable stand as set forth in claim 1, in combination with a bag supported from said upper rim portions.

8. A two-piece portable stand comprising two identical portions, each having opposed upper and lower rim portions; a first and second rib connecting the rim portions in mutually spaced, substantially parallel relation, said first rib including male and female clip means in mutually spaced relation along its length, whereby, on reversing one said first rib lengthwise, relative to the other said first rib, and bringing said male clip means of said first ribs into registry with said female clip means, said ribs may be clipped together in mutually secured relation to assemble said stand, wherein said rim portions serve to support said stand in a stable, upright position for the positioning of a bag between said portions, in draped supported relation from the upper end of the stand.

9. The portable stand as set forth in claim 8, wherein each said first rib includes ear portions in mutually opposed, spaced relation to receive a protruding portion of the other said first rib in entered relation between said ear portions, to substantially preclude twisting of one of said first rib relative to the other said first rib, and to maintain said two first ribs in mutually engaged relation.

10. A portable stand for attachment of a bag in supported relation thereon, said stand having two identical, first and second, half portions, said two portions being capable of assembly in secured, adjoining relation to form a shaped upper rim and a shaped lower rim, with supporting rib means extending therebetween, wherein a first rib of said first stand portion is in secured, engaged relation with a first rib of said second stand portion, said first rib of said first portion and said first rib of said second portion together forming a part of said rib means; and said lower rim portion supports said stand in stable, standing relation, and wherein said first ribs each have a centrally located portion offset in underlying relation below a said rim, said offset portions combining upon assembly to form an aperture.

* * * * *